(12) United States Patent
Fischer et al.

(10) Patent No.: US 8,289,948 B2
(45) Date of Patent: Oct. 16, 2012

(54) METHOD AND SYSTEM FOR BRIDGING AND ROUTING OFFLOAD IN A MULTIPORT WIRELESS SYSTEM

(75) Inventors: Matthew Fischer, Mountain View, CA (US); Raymond Hayes, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 470 days.

(21) Appl. No.: 11/454,207

(22) Filed: Jun. 16, 2006

(65) Prior Publication Data
US 2007/0291707 A1 Dec. 20, 2007

(51) Int. Cl.
*H04L 12/28* (2006.01)
*H04L 12/56* (2006.01)

(52) U.S. Cl. .......................... 370/351; 370/392
(58) Field of Classification Search .................. 370/338, 370/401, 466, 467
See application file for complete search history.

(56) References Cited

U.S. PATENT DOCUMENTS

| | | | |
|---|---|---|---|
| 5,495,484 A * | 2/1996 | Self et al. | 370/338 |
| 6,081,518 A * | 6/2000 | Bowman-Amuah | 370/352 |
| 6,125,113 A * | 9/2000 | Farris et al. | 370/389 |
| 6,693,899 B1 * | 2/2004 | Makridakis | 370/356 |
| 6,704,303 B1 * | 3/2004 | Bowman-Amuah | 370/352 |
| 2004/0087344 A1 * | 5/2004 | Parra et al. | 455/562.1 |
| 2004/0120281 A1 * | 6/2004 | Gazzard | 370/328 |
| 2004/0223184 A1 * | 11/2004 | Kusumoto et al. | 358/1.15 |
| 2004/0266427 A1 * | 12/2004 | Kurokawa | 455/426.2 |
| 2005/0237993 A1 * | 10/2005 | Hong et al. | 370/349 |
| 2007/0071034 A1 * | 3/2007 | Fleming | 370/474 |

* cited by examiner

*Primary Examiner* — John Blanton
(74) *Attorney, Agent, or Firm* — Garlick & Markison; Bruce E. Garlick

(57) ABSTRACT

Aspects of a method and system for bridging and routing offload in a multiport wireless system are presented. Various aspects of the system may include a wireless network interface subsystem that enables transcoding of at least a portion of a data packet received by the wireless network interface subsystem. The wireless network interface subsystem may enable transfer of the transcoded portion of the data packet from the wireless network interface subsystem to a wired network interface subsystem that is communicatively coupled thereto. The transcoded portion of the data packet may be compliant with a format utilized by the wired network interface subsystem.

21 Claims, 5 Drawing Sheets

METHOD AND SYSTEM FOR BRIDGING AND ROUTING OFFLOAD IN A MULTIPORT WIRELESS SYSTEM

CROSS-REFERENCE TO RELATED APPLICATIONS/INCORPORATION BY REFERENCE

NOT APPLICABLE.

FIELD OF THE INVENTION

Certain embodiments of the invention relate to wireless communication. More specifically, certain embodiments of the invention relate to a method and system for bridging and routing offload in a multiport wireless system.

BACKGROUND OF THE INVENTION

A portal device may receive and/or transmit information via a wireless network, for example a wireless local area network (WLAN) and/or a wireless wide area network (WAN), and/or via a wired network, for example a wired local area network (LAN), viand/or a wired WAN. Within the portal device, a wireless network interface subsystem, for example a WLAN network interface card (NIC), may enable the portal device to be communicatively coupled to a wireless network, while a wired network interface subsystem, for example a LAN NIC or a WAN NIC, may enable the portal device to be communicatively coupled to a wired network. The wireless network interface subsystem may receive and/or transmit wireless network frames, for example WLAN frames, from and/or to a wireless network. The wired network interface subsystem may receive and/or transmit wired network frames, for example LAN frames, from and/or to a wired network. The wireless network frame may comprise a service data unit (SDU) and a wireless network header, for example an IEEE 802.11 header. The SDU may comprise information being communicated, via one or more networks, between a source terminal device and a destination terminal device. Personal computers, personal digital assistants (PDAs), and WLAN stations are exemplary terminal devices, which may be communicatively coupled via one or more networks. The wired network frame may comprise an SDU and a wired network header, for example an IEEE 802.3 header. The portal may enable reception of a wireless network frame via a wireless network with subsequent transmission of a corresponding wired network frame via a wired network. The portal may also enable reception of a wired network frame via a wired network with subsequent transmission of a corresponding wireless network frame via a wireless network. When the wired network and the wireless network are logically associated with a common network, the transfer of frames between the wired network and wireless network may be referred to as bridging. When the wired network and the wireless network are logically associated with different networks, the transfer of frames between the wired network and the wireless network may be referred to as routing. Bridging and/or routing may comprise functionality that enables contents within a wired network header and/or SDU to be converted to form contents for a corresponding wireless network header and/or SDU. The conversion may be referred to as transcoding. Similarly, bridging and/or routing may comprise functionality that enables a wireless network header and/or SDU to be transcoded to form a corresponding wired network header and/or SDU.

In some conventional portal devices, a host processor may perform a bridging and/or routing function. The host processor may enable execution of a routing protocol, for example open shortest path first (OSPF), and/or a bridging protocol, for example a spanning tree algorithm, to determine a network interface subsystem, which is to be utilized for transmitting at least a portion of a received frame via a corresponding network. The host processor may retrieve a header portion of a received wireless network frame from a wireless network interface subsystem. The host processor may determine that at least a portion of the received wireless network frame is to be transmitted via a wired network interface subsystem. The host processor may transcode the wireless network header and/or SDU to form a corresponding wired network header and/or SDU. The host processor may then instruct the wireless network interface subsystem to transfer the transcoded frame, comprising at least a portion of the SDU from the received wireless network frame and the corresponding wired network header, to the wired network interface subsystem. The wired network interface subsystem may subsequently transmit the transcoded frame via a wired network. Similarly, the host processor may retrieve a header portion of a received wired network frame from a wired network interface subsystem. The host processor may determine that at least a portion of the received wired network frame is to be transmitted via a wireless network interface subsystem. The host processor may transcode the wired network header and/or SDU to form a corresponding wireless network header and/or SDU. The host processor may then instruct the wired network interface subsystem to transfer the transcoded frame, comprising at least a portion of the SDU from the received wired network frame and the corresponding wireless network header, to the wireless network interface subsystem. The wireless network interface subsystem may subsequently transmit the transcoded frame via a wireless network. One limitation for this approach is that the wireless network interface subsystem may be required to buffer one or more received wireless network frames while the host processor makes bridging and/or routing determinations for a current received wireless network frame, and transcodes the associated wireless network header based on the bridging and/or routing determinations.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for bridging and routing offload in a multiport wireless system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for bridging and routing offload in a multiport wireless system. Various embodiments of the invention may provide bridging and/or routing offload, which may enable a network interface subsystem to perform a bridging and/or routing function that may be performed by a host processor in some conventional portal devices. Bridging and/or routing offload may enable a wireless network interface subsystem, for example, to receive a wireless network frame via a wireless network and determine an outgoing wired network interface subsystem or wireless network interface subsystem to be utilized for transmitting at least a portion of the received wireless network frame. The wireless network interface subsystem may generate a corresponding header by transcoding the wireless network header and/or SDU in the received wireless network frame based on the determination. The wireless network interface subsystem may subsequently transfer the transcoded frame, comprising at least a portion of the SDU from the received wireless network frame and the corresponding header, to the outgoing wired network interface subsystem or wireless network interface subsystem based on the determination. Various embodiments of the invention may enable a wireless network interface subsystem to achieve higher data transfer rates for bridging and/or routing in comparison to some conventional wireless network interface subsystem. Various embodiments of the invention may also reduce buffering requirements in comparison to some conventional wireless network interface subsystems.

Figure 1:
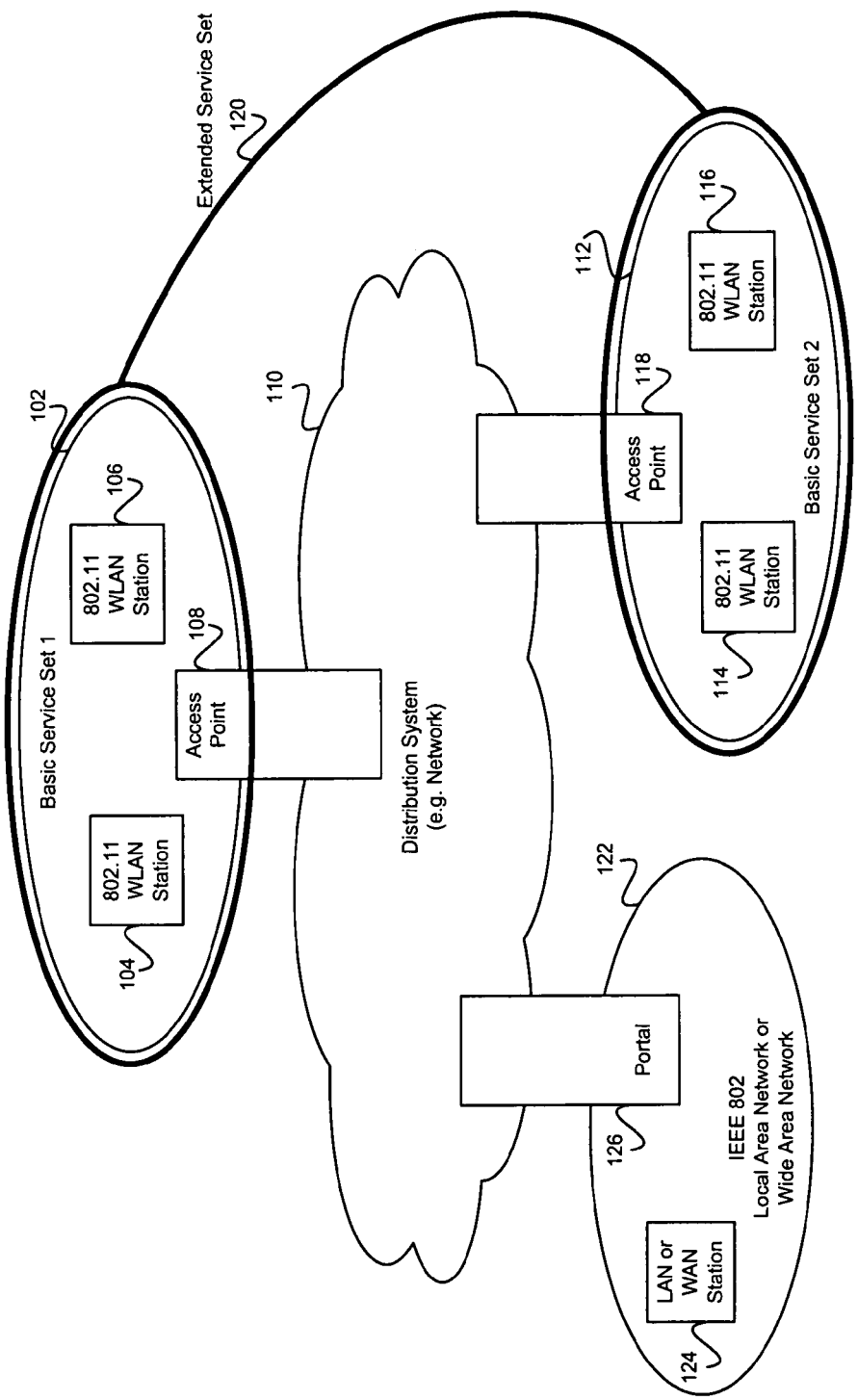
FIG. 1 is a block diagram of an exemplary system for wireless data communications, which may be utilized in connection with an embodiment of the invention.

FIG. 1 is a block diagram of an exemplary system for wireless data communications, which may be utilized in connection with an embodiment of the invention. With reference to FIG. 1, there is shown a distribution system (DS) 110, an extended service set (ESS) 120, and an IEEE 802 LAN or WAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802 LAN 122 or WAN may comprise a LAN or WAN station 124, and a portal 126. An IEEE 802.11 WLAN station, or IEEE 802.11 WLAN device, is a WLAN system that may be compliant with at least a portion of the IEEE 802.11 standard.

A WLAN is a communications networking environment that comprises a plurality of WLAN devices that may communicate wirelessly via one or more uplink and/or downlink RF channels. The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118. Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. The WLAN station 104 may subsequently communicate information wirelessly via the BSS 102. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN or WAN 122 such as the 802 LAN or WAN station 124. The communication of reachability information about the first 802.11 WLAN station 104 may enable WLAN stations that are not in BSS 102, but are associated with ESS 120, to communicate wirelessly with the first 802.11 WLAN station 104 through ESS 120.

The DS 110 may provide an infrastructure which enables a first 802.11 WLAN station 104 in one BSS 102, to communicate wirelessly with a first 802.11 WLAN station 114 in another BSS 112. The DS 110 may also enable a first 802.11 WLAN station 104 in one BSS 102 to communicate with an 802 LAN or WAN station 124 in an IEEE 802 LAN or WAN 122, implemented as, for example a wired LAN or WAN. The AP 108, AP 118, or portal 126 may provide a means by which a station in a BSS 102, BSS 112, or LAN or WAN 122 may communicate information via the DS 110. The first 802.11 WLAN station 104 in BSS 102 may communicate information wirelessly to a first 802.11 WLAN station 114 in BSS 112 by transmitting the information wirelessly to AP 108, which may transmit the information via the DS 110 to AP 118, which in turn may transmit the information wirelessly to station 114 in BSS 112. The first 802.11 WLAN station 104 may communicate information wirelessly to the 802 LAN or WAN station 124 in LAN or WAN 122 by transmitting the information wirelessly to AP 108, which may transmit the information via the DS 110 to the portal 126, which in turn may transmit the information to the 802 LAN or WAN station 124 in LAN or WAN 122. The DS 110 may utilize wireless communications via an RF channel, wired communications, such as IEEE 802.3 or Ethernet, or a combination thereof.

A WLAN station, such as 104, 114, or AP, such as 108, 118, may utilize one or more transmitting antennas, and one or more receiving antennas when communicating information. A WLAN station or AP that utilizes a plurality of transmitting antennas and/or a plurality of receiving antennas may be referred to as a multiple input multiple output (MIMO) system.

Figure 2:
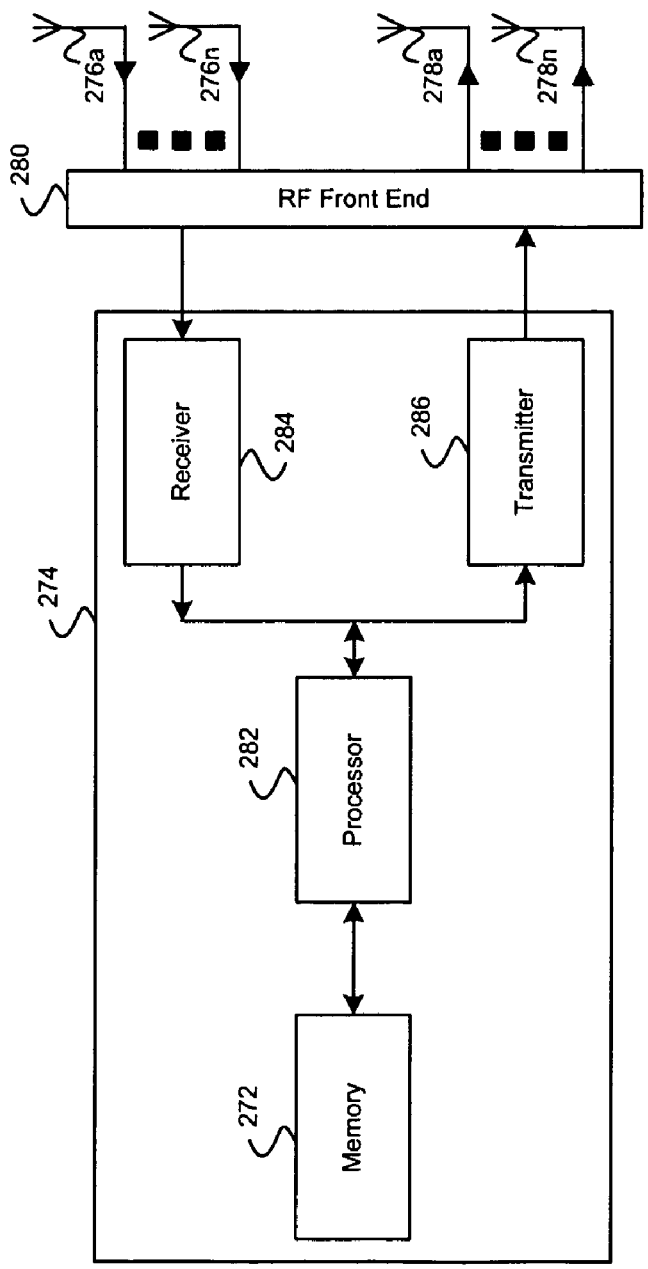
FIG. 2 is a block diagram of an exemplary wireless transceiver system that may be utilized in connection with an embodiment of the invention.

FIG. 2 is a block diagram of an exemplary wireless transceiver system that may be utilized in connection with an embodiment of the invention. The wireless transceiver may be utilized in connection with a portal 126, an access point 106, and/or an 802.11 WLAN station 104, for example. An exemplary embodiment of a transceiver may be a wireless network interface subsystem. With reference to FIG. 2 there is shown a transceiver 274, an RF front end 280, one or more receiving antennas 276a, . . . , 276n, and one or more transmitting antennas 278a, ..., 278n. The transceiver 274 may comprise a processor 282, memory 272, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. These tasks may further comprise medium access control (MAC) layer functions as specified by pertinent standards.

The memory 272 may comprise suitable logic, circuitry, and/or code that may be utilized to enable storage and/or retrieval of data and/or code. Stored code may, for example, comprise an implementation for a bridging and/or routing protocol. Stored data may, for example, comprise data compiled based on execution of code for a routing and/or bridging protocol. Stored data may also comprise received data, and/or data to be transmitted. Retrieved data and/or code may be assigned physical resources within the memory 272 for the storage. The stored data and/or code may be subsequently available for retrieval. Retrieved data and/or code may be output by the memory 272 and communicated to other devices, components, and/or subsystems that may be communicatively coupled, directly and/or indirectly, to the memory 272. The memory 272 may enable the stored data and/or code to remain stored and/or available for subsequent retrieval until the resources allocated for the storage are deallocated. Physical resources may be deallocated based on a received instruction that the stored data and/or code be erased from the memory 272, or based on a received instruction that the physical resources be allocated for the storage of subsequent data and/or code. The memory may utilize a plurality of storage medium technologies such as volatile memory, for example, random access memory (RAM), and/or nonvolatile memory, for example, electrically erasable programmable read only memory (EEPROM).

The receiver 284 may perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via the one or more antennas 276a, ..., 276n, by converting the RF signal to baseband and generating a digital equivalent of the received analog baseband signal. The RF front end 280 may also transmit analog RF signals via an antenna 278a, ..., 278n, by converting a digital baseband signal to an analog RF signal.

In operation, the processor 282 may receive data from the receiver 284. The processor 282 may communicate received data to the memory 272 for storage. The processor 282 may enable retrieval of data from the memory 272 to be transmitted via an RF channel by the transmitter 286. The memory 272 may communicate the data to the processor 282. The processor 282 may generate signals to control the operation of the modulation process in the transmitter 286, and of the demodulation process in the receiver 284.

Figure 3:
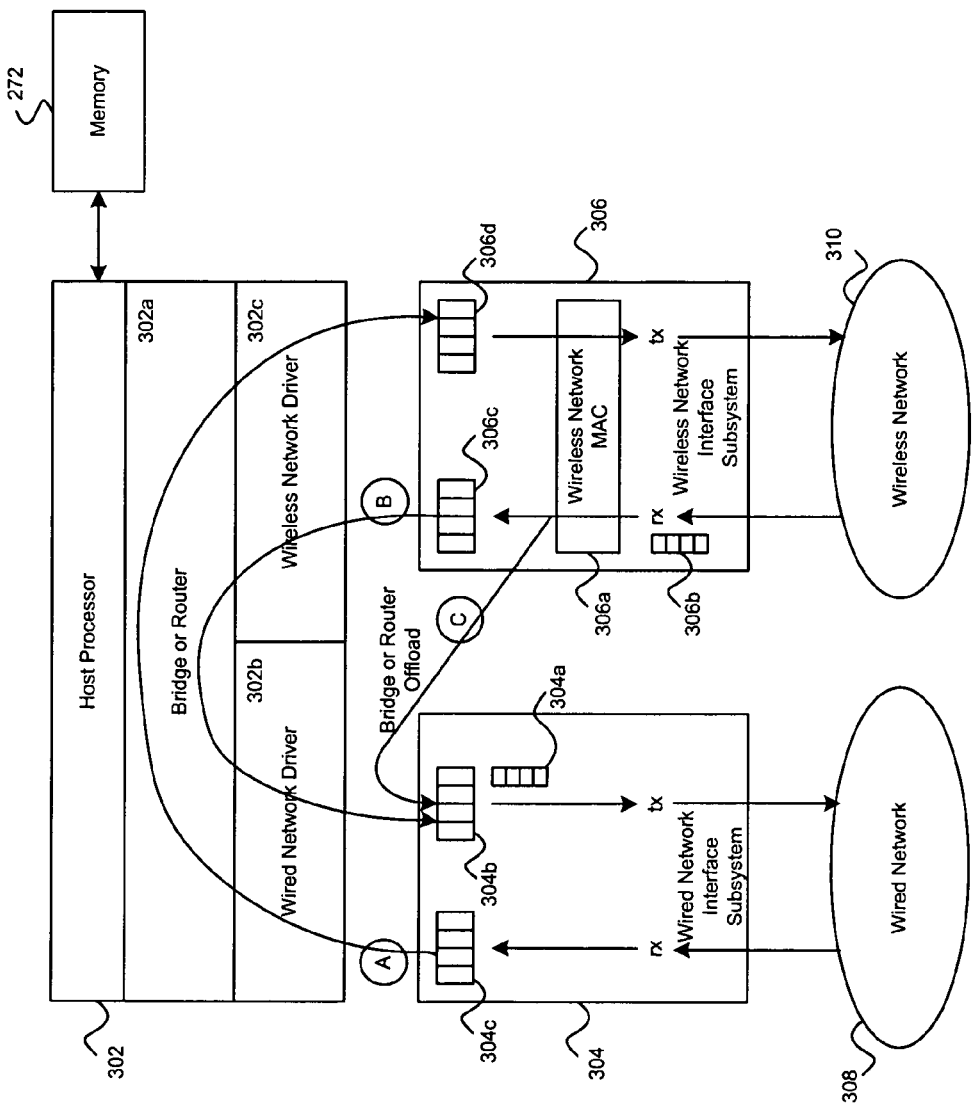
FIG. 3 is a block diagram of an exemplary system for bridging and routing in a multiport system comprising at least one wireless port, in accordance with an embodiment of the invention.

FIG. 3 is a block diagram of an exemplary system for bridging and routing in a multiport system comprising at least one wireless port, in accordance with an embodiment of the invention. Referring to FIG. 3, there is shown a host processor 302, a memory 272, a wired network interface subsystem 304, a wireless network interface subsystem 306, a wired network 308, and a wireless network 310. The memory 272 may be as described in FIG. 2.

The wired network 308 may comprise functionality substantially as described for the IEEE 802 LAN or WAN 122 (FIG. 1). The wireless network 310 may comprise functionality substantially as described for the distribution system 110 and/or the basic service set 102. The wireless network interface subsystem 306 may comprise functionality substantially as described for the transceiver 274 (FIG. 2).

The host processor 302 may comprise suitable logic, circuitry, and/or code that may enable execution of bridging and/or routing protocols. The host processor 302 may also enable transcoding of header information in received wired network frames or wireless network frames. The host processor 302 may comprise a bridge or router function 302a, a wired network driver function 302b, and a wireless network driver function 302c. The bridge or router function 302a may comprise suitable logic, circuitry, and/or code that may enable the execution of bridging and/or routing protocols within the host processor 302. A portion of the code may be retrieved from, and/or stored to, the memory 272. The bridge or router function 302a may enable a host processor 302 to select an outgoing network interface subsystem based on header information contained in a received wired network frame or wireless network frame. The outgoing network interface subsystem may be determined based on the bridging and/or routing protocols. The selected outgoing network interface subsystem may transmit at least a portion of the received frame via a wired network or wireless network, for example.

The wired network driver function 302b may comprise suitable logic, circuitry, and/or code that may enable the transcoding of a wired network header and/or SDU in a received wired network frame to generate a corresponding wireless network header and/or SDU. The wired network driver function 302b may enable the host processor 302 to receive at least a portion of a received wired network frame. The wired network frame may be received via a wired network interface subsystem 304. The received portion of the received wired network frame may comprise a wired network header, for example. The received wired network header may be communicated to the bridge or router function 302a. The bridge or router function 302a may select an outgoing wireless network interface subsystem based on the header information. The bridge or router function 302a may communicate the wired network header to a wireless network driver function 302c corresponding to the selected outgoing network interface subsystem. The wireless network driver function 302c associated with the outgoing network interface subsystem may transcode the wired network header and/or SDU from the received wired network frame to generate a corresponding wireless network header and/or SDU.

The wired network driver function 302b may also enable a transcoded wired network frame, comprising at least a portion of an SDU from a received wireless network frame and a wired network header generated by transcoding a corresponding wireless network header, to be transferred to an outgoing network interface subsystem. The corresponding wireless network header may have been previously communicated to the bridge or router function 302a, which subsequently communicated the corresponding wireless network header to the wired network driver function 302b that performed the transcoding. The wired network driver function 302b may communicate a request to the wireless network driver 302c associated with the receiving network interface subsystem that received the wireless network frame. The request may instruct the wireless network driver 302c to communicate an instruction to the receiving network interface subsystem that will cause the portion of the SDU to be transferred to the outgoing network interface subsystem. The wired network driver function 302b may transfer the wired network header to the outgoing network interface subsystem.

The wired network driver function 302b may also enable a wired network interface subsystem to transfer at least a portion of a wired network frame to a subsequent wired network interface subsystem and/or to a wireless network interface subsystem. The transferred portion of the wired network frame may comprise at least a portion of the SDU from a received wired network frame. The wired network driver function 302b may communicate instructions that cause the wired network interface subsystem to perform the transfer.

The wireless network driver function 302c may comprise suitable logic, circuitry, and/or code that may enable the transcoding of a wireless network header and/or SDU in a received wireless network frame to generate a corresponding wired network header and/or SDU. The wireless network driver function 302c may enable the host processor 302 to receive at least a portion of a received wireless network frame. The wireless network frame may be received via a wireless network interface subsystem. The received portion of the received wireless network frame may comprise a wireless network header, for example. The received wireless network header may be communicated to the bridge or router function 302a. The bridge or router function 302a may select an outgoing wired network interface subsystem based on the header information. The bridge or router function 302a may communicate the wireless network header to a wired network driver function 302c corresponding to the selected outgoing network interface subsystem. The wired network driver function 302b associated with the outgoing network interface subsystem may transcode the wireless network header and/or SDU from the received wireless network frame to generate a corresponding wired network header and/or SDU.

The wireless network driver function 302c may also enable a transcoded wireless network frame, comprising at least a portion of an SDU from a received wired network frame and a wireless network header generated by transcoding a corresponding wired network header, to be transferred to an outgoing network interface subsystem. The corresponding wired network header may have been previously communicated to the bridge or router function 302a, which subsequently communicated the corresponding wired network header to the wireless network driver function 302c that performed the transcoding. The wireless network driver function 302c may communicate a request to the wired network driver 302b associated with the network interface subsystem that received the wired network frame. The request may instruct the wired network driver 302b to communicate an instruction to the receiving network interface subsystem that will cause the portion of the SDU to be transferred to the outgoing network interface subsystem. The wireless network driver function 302c may transfer the wireless network header to the outgoing network interface subsystem.

The wireless network driver function 302c may also enable a wireless network interface subsystem to transfer at least a portion of a wireless network frame to a subsequent wireless network interface subsystem and/or to a wired network interface subsystem. The transferred portion of the wired network frame may comprise at least a portion of the SDU from a received wireless network frame. The wireless network driver function 302c may communicate instructions that cause the wireless network interface subsystem to perform the transfer.

The wired network interface subsystem 304 may comprise suitable logic, circuitry, and/or code that may enable transmitting and receiving of wired network frames via a wired network 308. The wired network interface subsystem 304 may also enable communication of wired network frames to/from a host processor 302. The wired network interface subsystem 304 may also enable communication of wired network frames to/from a wireless network interface subsystem 306, or to/from a subsequent wired network interface subsystem. The wired network interface subsystem 304 may comprise an input buffer 304c, and an output buffer 304b. The output buffer 304b may be utilized to store wired network frames 304a that are to be transmitted via the wired network 308. The input buffer 304c may be utilized to store wired network frames that are being received via the wired network 308.

The wireless network interface subsystem 306 may comprise suitable logic, circuitry, and/or code that may enable transmitting and receiving of wireless network frames via a wireless network 310. The wireless network interface subsystem 306 may also enable communication of wireless network frames to/from a host processor 302. The wireless network interface subsystem 306 may also enable communication of wireless network frames to/from a wired network interface subsystem 304, or to/from a subsequent wireless network interface subsystem. The wireless network interface subsystem 306 may comprise an input buffer 306c, and an output buffer 306d. The input buffer 306c may be utilized to store wireless network frames 306b that are to being received via the wireless network 310. The output buffer 306d may be utilized to store wireless network frames that are being transmitted via the wireless network 310.

The wireless network interface subsystem 306 may also comprise a wireless network MAC function 306a. The wireless network MAC function 306a may comprise MAC layer functionality according to IEEE 802.11 specifications. In various embodiments of the invention, the wireless network MAC function 306a may also comprise at least a portion of bridging and/or routing functionality. The wireless network MAC function 306a may enable the wireless network interface subsystem 306 to determine an outgoing network interface subsystem for a received wireless network frame 306b based on the corresponding wireless network header. The wireless network MAC function 306a may also enable the wireless network interface subsystem 306 to transcode the corresponding wireless network header and/or SDU to generate a wired network header and/or SDU when the outgoing network interface subsystem comprises functionality for a wired network interface subsystem 304. The wireless network MAC function 306a may enable the wireless network interface subsystem 306 to transfer the transcoded wired network frame, comprising at least a portion of the SDU from the received wireless network frame and the generated wired network header, to a wired network interface subsystem 304, and/or subsequent wireless network interface subsystem.

In an operation for transcoding of a wired network frame to generate a corresponding wireless network frame in a conventional portal device 126, a wired network interface subsystem 304 may receive a wired network frame via a wired network 308. The wired network frame may be stored in the input buffer 304c. The wired network driver function 302b may enable at least the header portion of the received wired network frame to be retrieved from the input buffer 304c, and communicated to the bridge or router function 302a as indicated in label A (FIG. 3). The bridge or router function 302a may determine that at least a portion of the received wired network frame is to be transmitted by the wireless network interface subsystem 306 via the wireless network 310. The bridge or router function 302a may communicate the wired network header from the received wired network frame to the wireless network driver function 302c. The wireless network driver function 302c may be associated with the wireless network interface subsystem 306. The wireless network driver function 302c may transcode the wired network header and/or SDU to generate a corresponding wireless network header and/or SDU. The wireless network driver function 302c may communicate the corresponding wireless network header to the wireless network interface subsystem 306. The corresponding wireless network header may be stored in the output buffer 306d. The wireless network driver function 302c may communicate a request to the wired network driver function 302b. The request may instruct the wired network driver function 302b to communicate instructions that cause the wired network interface subsystem 304 to transfer at least a portion of the received wired network frame from the input buffer 304c to the output buffer 306d within the wireless network interface subsystem 306. The portion of the received wired network frame may comprise at least a portion of the SDU portion of the received wired network frame. A wireless network frame may be generated comprising the generated wireless network header and at least a portion of the received wired network frame transferred from the input buffer 304c. The wireless network MAC function 306a may enable the generated wireless network frame to be retrieved from the output buffer 306d, and subsequently transmitted via the wireless network 310.

In an operation for transcoding of a wireless network frame to generate a corresponding wired network frame in a conventional portal device 126, a wireless network interface subsystem 306 may receive a wireless network frame 306b via a wireless network 310. The wireless network MAC function 306a may enable the received wireless network frame 306b to be stored in the input buffer 306c. The wireless network driver function 302c may enable at least the header portion of the received wireless network frame 306b to be retrieved from the input buffer 306c, and communicated to the bridge or router function 302a as indicated in label B (FIG. 3). The bridge or router function 302a may determine that at least a portion of the received wireless network frame 306b is to be transmitted by the wired network interface subsystem 304 via the wired network 308. The bridge or router function 302a may communicate the wireless network header from the received wireless network frame 306b to the wired network driver function 302b. The wired network driver function 302b may be associated with the wired network interface subsystem 304. The wired network driver function 302b may transcode the wireless network header and/or SDU to generate a corresponding wired network header and/or SDU. The wired network driver function 302b may communicate the corresponding wired network header to the wired network interface subsystem 304. The corresponding wired network header may be stored in the output buffer 304b. The wired network driver function 302b may communicate a request to the wireless network driver function 302c. The request may instruct the wireless network driver function 302c to communicate instructions that cause the wireless network interface subsystem 306 to transfer at least a portion of the received wireless network frame 306b from the input buffer 306c to the output buffer 304b within the wired network interface subsystem 304. The portion may comprise at least a portion of the SDU portion of the received wireless network frame 306b. A wired network frame may be generated comprising the generated wired network header and at least a portion of the received wireless network frame 306b transferred from the input buffer 306c. The wired network interface subsystem 304 may retrieve the generated wired network frame from the input buffer 304b. The wired network interface subsystem 304 may subsequently transmit the generated wired network frame 304a via the wired network 308.

In an embodiment of the invention, an operation for transcoding of a wireless network frame to generate a corresponding wired network frame in a portal device 126 may be performed by a wireless network interface subsystem 306 that receives a wireless network frame 306b via a wireless network 310. The wireless network MAC function 306a may determine whether at least a portion of the received wireless network frame 306b is to be transmitted by the wired network interface subsystem 304 via the wired network 308. The wireless network MAC function 306a may enable transcoding of the wireless network header and/or SDU to generate a corresponding wired network header and/or SDU. A wired network frame may be generated that comprises the generated wired network header and at least a portion of the received wireless network frame 306b. The portion of the received wireless network frame 306b may comprise at least a portion of the SDU portion of the received wireless network frame 306b. The wireless network MAC function 306a may cause the generated wired network frame to be transferred to the output buffer 304b within the wired network interface subsystem 304. The wired network interface subsystem 304 may retrieve the generated wired network frame from the input buffer 304b. The wired network interface subsystem 304 may subsequently transmit the generated wired network frame 304a via the wired network 308.

In one aspect of the invention, the host processor 302 may compile one or more databases based on one or more routing and/or bridging protocols. The databases may be stored in the memory 272. The databases may be utilized by the bridge or router function 302a when making routing and/or bridging determinations. The host processor 302 may communicate information from the databases to the wireless network interface subsystem 306. The communicated information may enable the wireless network MAC function 306a to make routing and/or bridging determinations. The communicated information may also be utilized for transcoding a wireless network header and/or SDU portion of a received wireless network frame 306b to generate a corresponding wired network header and/or SDU. The host processor 302 may communicate subsequent information to the wireless network interface subsystem 306 when information in the one or more databases is modified, or when additional information is added to the one or more databases.

Figure 4:
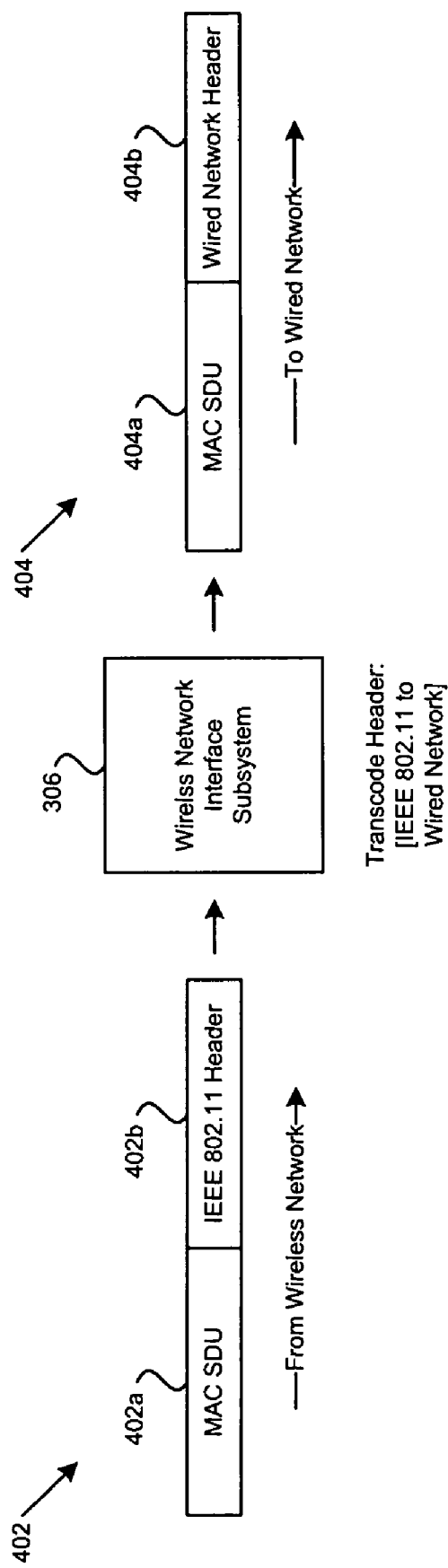
FIG. 4 is a diagram illustrating exemplary frame header transcoding, in accordance with an embodiment of the invention.

FIG. 4 is a diagram illustrating exemplary frame header transcoding, in accordance with an embodiment of the invention. Referring to FIG. 4, there is shown a received wireless network frame 402, a wireless network interface subsystem 306, and a transmitted wired network frame 404. The received wireless network frame 402 may comprise a MAC SDU portion 402a, and an IEEE 802.11 header portion 402b. The transmitted wired network frame 404 may comprise a MAC SDU portion 404a, and a wired network header portion 404b. The wireless network interface subsystem 306 may be as described in FIG. 3. The MAC SDU 402a may correspond to an SDU portion of a received wireless network frame 306b (FIG. 3). The IEEE 802.11 header may correspond to a wireless network header of the received wireless network frame 306b. The MAC SDU 404a may correspond to an SDU portion of a generated wired network frame 304a. The wired network header 404b may correspond to a generated wired network header of the generated wired network frame 304a.

In operation, the received wireless network frame 402 may be received by the wireless network interface subsystem 306 from a wireless network 310. The wireless network interface subsystem 306 may transcode the IEEE 802.11 header 402b and/or SDU to generate a corresponding wired network header 404b and/or SDU. The wireless network interface subsystem 306 may generate a wired network frame 404 that comprises at least a portion of the MAC SDU 402a, and the corresponding wired network header 404b. The portion of the MAC SDU 402a may be utilized by the wireless network interface subsystem 306 to generate at least a portion of the MAC SDU 404a. The wireless network interface subsystem 306 may transmit the wired network frame 404 to a wired network 308.

Figure 5:
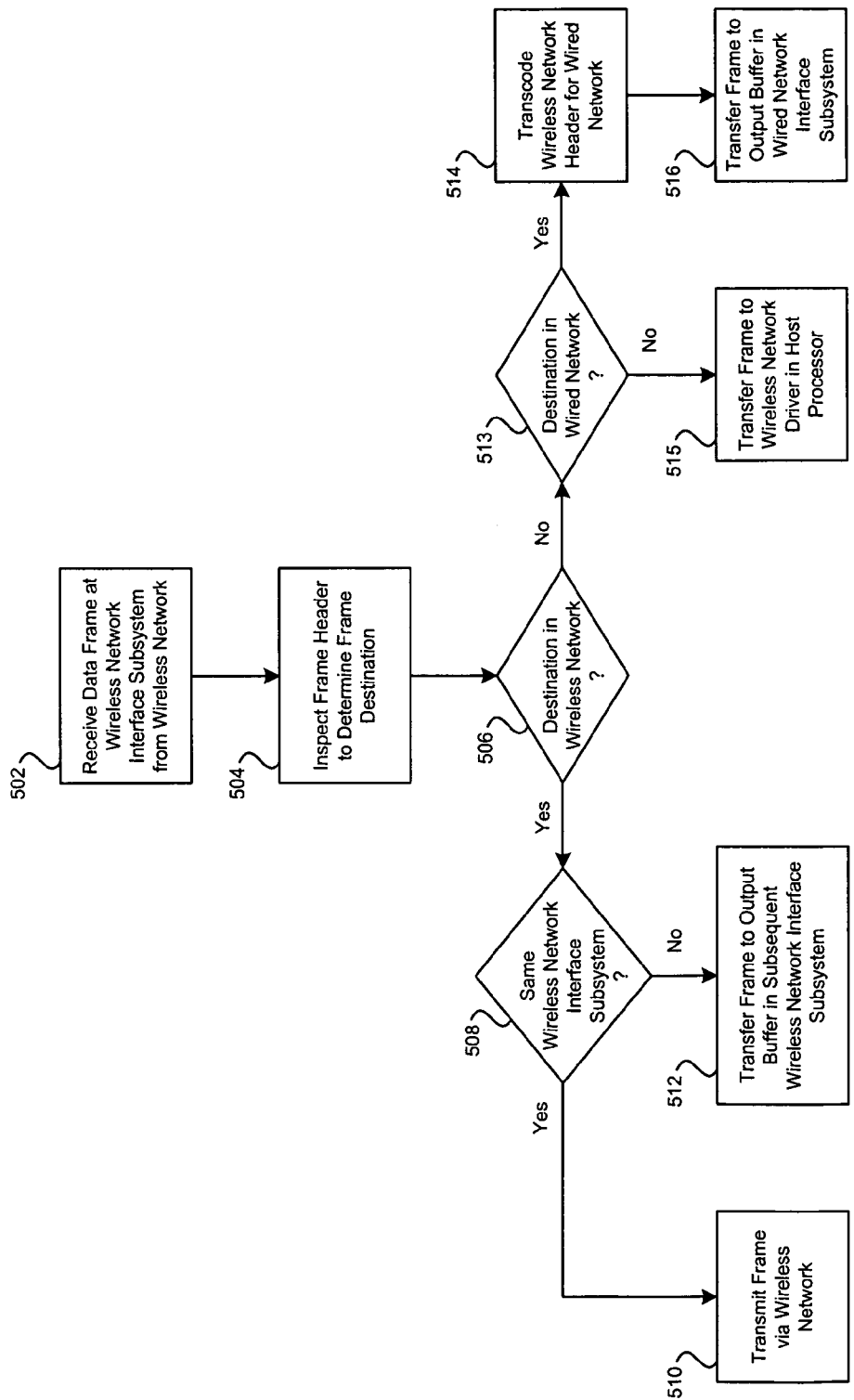
FIG. 5 is a flowchart illustrating exemplary steps for bridging and routing in a multiport wireless system, in accordance with an embodiment of the invention.

FIG. 5 is a flowchart illustrating exemplary steps for bridging and routing in a multiport wireless system, in accordance with an embodiment of the invention. Referring to FIG. 5, in step 502 a wireless network frame 306b may be received at a wireless network interface subsystem 306 from a wireless network 310. In step 504, the wireless network interface subsystem 306 may inspect the header portion of the wireless network frame 306b to determine a destination network interface subsystem. The destination network interface subsystem may be utilized for transmitting at least a portion of the received wireless network frame 306b.

In step 506, the wireless network interface subsystem 306 may determine whether the destination network interface subsystem is communicatively coupled to a wireless network 310. In instances where the destination network interface subsystem is determined to be communicatively coupled to a wireless network 310, in step 508, the wireless network interface subsystem 306 may determine whether the destination network interface subsystem is the wireless network interface subsystem 306 that received the wireless network frame 306b. In instances where the destination network interface subsystem is the wireless network interface subsystem 306, in step 510 the wireless network interface subsystem 306 may transmit the received wireless network frame via the wireless network 310. When the destination network interface subsystem is a subsequent wireless network interface subsystem, in step 512, the wireless network interface subsystem 306 may transfer the wireless network frame 306b to the subsequent wireless network interface subsystem.

When the destination network interface subsystem is not determined in step 506 to be communicatively coupled to a wireless network, in step 513, the wireless network interface subsystem 306 may determine whether the destination network interface subsystem is communicatively coupled to a wired network 308. When the destination network interface subsystem is determined in step 513 to be communicatively coupled to a wired network, in step 514 the wireless network header and/or SDU in the wireless network frame 306b may be transcoded to generate a wired network header and/or SDU, by the wireless network interface subsystem 306. In step 516, a wired network frame 304a may be generated by the wireless network interface subsystem 306 that comprises the generated wired network header and at least a portion of the SDU portion of the received wireless network frame 306b. The generated wired network frame 304a may be transferred by the wireless network interface subsystem 306 to an output buffer 304b in a wired network interface subsystem 304.

When the destination network interface subsystem is determined in step 513 to be communicatively coupled to a wired network, in step 514 the wireless network header and/or SDU in the wireless network frame 306b may be transcoded to generate a wired network header and/or SDU by the wireless network interface subsystem 306. In step 516, a wired network frame 304a may be generated by the wireless network interface subsystem 306 that comprises the generated wired network header, and at least a portion of the SDU portion of the received wireless network frame 306b. The generated wired network frame 304a may be transferred by the wireless network interface subsystem 306 to an output buffer 304b in a wired network interface subsystem 304.

When the destination network interface subsystem is not determined to be communicatively coupled to a wired network in step 513, in step 515, the received data frame may be transferred by the wireless network interface subsystem 306 to the wireless network driver 302c within the host processor 302.

Aspects of a method and system for bridging and routing offload in a multiport wireless system are presented. Various aspects of the system may include a wireless network interface subsystem that enables transcoding of at least a portion of a data packet received by the wireless network interface subsystem. The wireless network interface subsystem may enable transfer of the transcoded portion of the data packet from the wireless network interface subsystem to a wired network interface subsystem that is communicatively coupled thereto. The transcoded portion of the data packet may be compliant with a format utilized by the wired network interface subsystem.

Various aspects of a system for bridging and routing offload in a multiport wireless system may comprise a wireless network interface subsystem 306 that enables transcoding of at least a portion of data packets received by the wireless network interface subsystem 306. An exemplary data packet may comprise a wireless network frame 306b. The wireless network interface subsystem 306 may enable transfer of the transcoded portion of the data packet from the wireless network interface subsystem 306 to a wired network interface subsystem 304 that is communicatively coupled thereto. The transcoded portion of the data packet may be compliant with a format utilized by the wired network interface subsystem 304.

The wireless network interface subsystem 306 may be communicatively coupled to at least one wireless network 310. The wired network interface subsystem 304 may be communicatively coupled to at least one wired network 308. A portal device 126 may comprise at least one wireless network interface subsystem 306, and at least one wired network interface subsystem 304. The wireless network interface subsystem 306 may enable reception of information from a host processor 302 that is utilized by the wireless network interface subsystem 306 for selecting the wired network interface subsystem 304.

The portion of the data packet may comprise an IEEE 802.11 header portion 402b of the received wireless network frame 402. The wireless network interface subsystem 306 may enable generation of a wired network header 404b based on a transcoded version of the IEEE 802.11 header portion 402b. The wireless network interface subsystem 306 may enable generation of the transcoded version of the received data packet by combining the generated wired network header 404b and at least a portion of the remaining portion of the MAC SDU 402a.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
   receiving a medium access control (MAC) layer data packet at a wireless network interface subsystem within a multipart communication system, wherein said multipart communication system comprises said wireless network interface subsystem, a wired network interface subsystem and a processor that is external to said wireless network interface subsystem and said wired network interface subsystem, said processor being used to perform transcoding of information communicated between said wireless network interface subsystem and said wired network interface subsystem;
   determining based on information received from said processor, whether at least a portion of said received medium access control (MAC) layer data packet is to be communicated via a wired network, wherein said received information is generated from a database compiled by said processor based on one or more routing and/or bridging protocols supported by said processor;
   transcoding based on said received information, within said wireless network interface subsystem, said at least a portion of said received medium access control (MAC) layer data packet based on said determining, to offload said performing of said transcoding from said processor; and
   transferring said transcoded at least a portion of said received medium access control (MAC) layer data packet from said wireless network interface subsystem to said wired network interface subsystem communicatively coupled thereto by direct access of memory buffers of the wired network interface subsystem by the wireless network interface subsystem, wherein said transcoded at least a portion of said received medium access control (MAC) layer data packet is compliant with a format utilized by said wired network interface subsystem.

2. The method according to claim 1, wherein said wireless network interface subsystem is communicatively coupled to at least one wireless network.

3. The method according to claim 1, wherein said wired network interface subsystem is communicatively coupled to at least one wired network.

4. The method according to claim 1, comprising receiving updated information from said processor when said database is updated or modified.

5. The method according to claim 1, wherein said at least a portion of said received medium access control (MAC) layer data packet comprises a header portion of said received medium access control (MAC) layer data packet.

6. The method according to claim 5, comprising generating a wired network header based on a transcoded version of said header portion of said received medium access control (MAC) layer data packet.

7. The method according to claim 6, comprising generating said transcoded version of said received medium access control (MAC) layer data packet by combining said generated wired network header and at least a portion of a remaining portion of said received medium access control (MAC) layer data packet.

8. A non-transitory computer readable medium having stored thereon, a computer program having at least one code section for processing signals in a communication system, the at least one code section being executable by a computer for causing the computer to perform steps comprising:
   receiving a medium access control (MAC) layer data packet at a wireless network interface subsystem within a multipart communication system, wherein said multipart communication system comprises said wireless network interface subsystem, a wired network interface subsystem and a processor that is external to said wireless network interface subsystem and said wired network interface subsystem, said processor being used to perform transcoding of information communicated between said wireless network interface subsystem and said wired network interface subsystem;
   determining based on information received from said processor, whether at least a portion of said received medium access control (MAC) layer data packet is to be communicated via a wired network, wherein said received information is generated from a database compiled by said processor based on one or more routing and/or bridging protocols supported by said processor;
   transcoding based on said received information, within said wireless network interface subsystem, said at least a portion of said received medium access control (MAC) layer data packet based on said determining, to offload said performing of said transcoding from said processor; and
   transferring said transcoded at least a portion of said received medium access control (MAC) layer data packet from said wireless network interface subsystem to said wired network interface subsystem communicatively coupled thereto by direct access of memory buffers of the wired network interface subsystem by the wireless network interface subsystem, wherein said transcoded at least a portion of said received medium access control (MAC) layer data packet is compliant with a format utilized by said wired network interface subsystem.

9. The non-transitory computer readable medium according to claim 8, wherein said wireless network interface subsystem is communicatively coupled to at least one wireless network.

10. The non-transitory computer readable medium according to claim 8, wherein said wired network interface subsystem is communicatively coupled to at least one wired network.

11. The non-transitory computer readable medium according to claim 8, wherein said at least one code section comprises code for receiving updated information from said processor when said database is updated or modified.

12. The non-transitory computer readable medium according to claim 8, wherein said at least a portion of said received medium access control (MAC) layer data packet comprises a header portion of said received medium access control (MAC) layer data packet.

13. The non-transitory computer readable medium according to claim 12, wherein said at least one code section comprises code for generating a wired network header based on a transcoded version of said header portion of said received medium access control (MAC) layer data packet.

14. The non-transitory computer readable medium according to claim 13, wherein said at least one code section comprises code for generating said transcoded version of said received medium access control (MAC) layer data packet by combining said generated wired network header and at least a portion of a remaining portion of said received medium access control (MAC) layer data packet.

15. A system for processing signals in a communication system, the system comprising:
one or more circuits in a wireless network interface subsystem within a multipart communication system that are operable to receive a medium access control (MAC) layer data packet, wherein said multipart communication system comprises said wireless network interface subsystem, a wired network interface subsystem and a processor that is external to said wireless network interface subsystem and said wired network interface subsystem, said processor being used to perform transcoding of information communicated between said wireless network interface subsystem and said wired network interface subsystem;
said one or more circuits are operable to determine based on information received from said processor, whether at least a portion of said received medium access control (MAC) layer data packet is to be communicated via a wired network, wherein said received information is generated from a database compiled by said processor based on one or more routing and/or bridging protocols supported by said processor;
said one or more circuits are operable to transcode based on said received information, within said wireless network interface subsystem said at least a portion of said received medium access control (MAC) layer data packet based on said determination to offload said performing of said transcoding from said processor; and
said one or more circuits are operable to transfer said transcoded at least a portion of said received medium access control (MAC) layer data packet to said wired network interface communicatively coupled thereto by direct access of memory buffers of the wired network interface subsystem by the wireless network interface subsystem, wherein said transcoded at least a portion of said received medium access control (MAC) layer data packet is compliant with a format utilized by said wired network interface.

16. The system according to claim 15, wherein said one or more circuits are communicatively coupled to at least one wireless network.

17. The system according to claim 15, wherein said one or more circuits are communicatively coupled to at least one wired network.

18. The system according to claim 15, wherein said one or more circuits are operable to receive updated information from said processor when said database is updated or modified.

19. The system according to claim 15, wherein said at least a portion of said received medium access control (MAC) layer data packet comprises a header portion of said received medium access control (MAC) layer data packet.

20. The system according to claim 19, wherein said one or more circuits are operable to generate a wired network header based on a transcoded version of said header portion of said received medium access control (MAC) layer data packet.

21. The system according to claim 20, wherein said one or more circuits are operable to generate said transcoded version of said received medium access control (MAC) layer data packet by combining said generated wired network header and at least a portion of a remaining portion of said received medium access control (MAC) layer data packet.

* * * * *